US012768734B2

(12) United States Patent
Mehrotra et al.

(10) Patent No.: US 12,768,734 B2
(45) Date of Patent: Oct. 20, 2026

(54) LAMINATE SUBSTRATE-BASED DIFFERENTIAL PRESSURE SENSOR PACKAGE COMBINING AIR CAVITY CHANNEL SUBSTRATE, OVERMOLD, AND LID WITH TWO CHIMNEYS

(71) Applicants: Renesas Electronics America Inc., Milpitas, CA (US); MEMS VISION INTERNATIONAL INC., Montreal (CA)

(72) Inventors: Gaurav Mehrotra, San Jose, CA (US); Km Rafidh Hassan, Austin, TX (US); Hazel Bacer Caballero, Gilbert, AZ (US); Young-Gon Kim, San Jose, CA (US); Steven Lee, Walnut, CA (US); Tommy Kwong Kin Tsang, Montreal (CA); Hani H. Tawfik, Montreal (CA); Mohannad Y. Elsayed, Saint-Lambert (CA); Karim Allidina, Montreal (CA)

(73) Assignees: Renesas Electronics America Inc., San Jose, CA (US); MEMS VISION INTERNATIONAL INC., Montreal (CA)

( * ) Notice: Subject to any disclaimer, the term of this patent is extended or adjusted under 35 U.S.C. 154(b) by 309 days.

(21) Appl. No.: 18/583,112

(22) Filed: Feb. 21, 2024

(65) Prior Publication Data

US 2025/0264367 A1 Aug. 21, 2025

(51) Int. Cl.
*G01L 13/02* (2006.01)
*G01L 19/00* (2006.01)

(52) U.S. Cl.
CPC ........ *G01L 13/025* (2013.01); *G01L 19/0038* (2013.01); *G01L 19/0069* (2013.01)

(58) Field of Classification Search
CPC ....... G01L 13/00; G01L 13/02; G01L 13/025; G01L 19/0038
See application file for complete search history.

(56) References Cited

U.S. PATENT DOCUMENTS 10,285,275 B2 * 5/2019 Larson .................... H05K 1/115
2010/0089169 A1 * 4/2010 Koehler .............. G01L 19/0038 73/756

(Continued)

OTHER PUBLICATIONS

Holmes et al., "Miniaturized Wet-Wet Differential Pressure Sensor", 2022 IEEE Sensors DOI: 10.1109/SENSORS52175.2022.9967161, 4 pages.

(Continued)

*Primary Examiner* — Herbert K Roberts
(74) *Attorney, Agent, or Firm* — SCULLY, SCOTT, MURPHY & PRESSER, P.C.

(57) ABSTRACT

The sensor device includes a substrate having upper and lower surfaces with a channel formed therebetween. First and second port holes are formed through the upper surface to the channel. The sensor device also includes an application-specific integrated circuit (ASIC) die mounted on the upper surface so as not to cover the first and second port holes. The sensor device further includes an overmolding formed on the upper surface that is molded over the ASIC die and forms first and second cavities surrounding the first and second port holes, respectively. The sensor device also includes a transducer electrically connected with the ASIC die and mounted within the first cavity on the upper surface so as to cover the first port hole. The sensor device further includes a lid attached to the overmolding having first and second chimneys.

20 Claims, 8 Drawing Sheets

(56) References Cited

U.S. PATENT DOCUMENTS

| | | | | |
|---|---|---|---|---|
| 2018/0323083 | A1* | 11/2018 | Langhanoja | B81B 7/0061 |
| 2019/0276306 | A1* | 9/2019 | Natan | B81B 7/0074 |
| 2019/0391046 | A1* | 12/2019 | Morsink | G01L 9/04 |
| 2020/0284677 | A1* | 9/2020 | Wagner | G01L 19/147 |

OTHER PUBLICATIONS

Fontana et al., "MEMS Pressure sensors-new LGA Packagings", Date Added to IEEE Xplore: Sep. 29, 2009, 7 pages.

Campabadal et al., "Flip-chip packaging of piezoresistive pressure sensors", Sensors and Actuators A 132 (2006) 415-419,https://www.sciencedirect.com/science/article/abs/pii/S0924424706001671?via%3Dihub, 5 pages.

Subbiah et al., "Flip-chip Die Attachment for High-temperature Pressure Sensor Packages up to 500° C", Date Added to IEEE Xplore: Nov. 29, 2018, DOI: 10.1109/ESTC.2018.8546394, 6 pages.

Braun et al., "Fan-out Wafer Level Packaging—A Platform for Advanced Sensor Packaging", Date Added to IEEE Xplore: Aug. 26, 2019, DOI 10.1109/ECTC.2019.00135, 7 pages.

Shaw et al., "Package Design of Pressure Sensors for High Volume Consumer Applications", Date Added to IEEE Xplore: Jun. 24, 2008, DOI: 10.1109/ECTC.2008.4550073, 7 pages.

* cited by examiner

LAMINATE SUBSTRATE-BASED DIFFERENTIAL PRESSURE SENSOR PACKAGE COMBINING AIR CAVITY CHANNEL SUBSTRATE, OVERMOLD, AND LID WITH TWO CHIMNEYS

BACKGROUND OF THE SPECIFICATION

The present disclosure relates to differential pressure sensors (DPS).

DPS are a type of pressure sensor device that measures differences in pressure between two points in a system. This allows for more accurate readings of fluid (liquid or gas) systems, where changes in pressure can be critical. By measuring pressures at different locations, these sensors enable the detection of flow rates, filter conditions, and other variables that influence system performance. Packaging of DPS can be very important. For example, overall sizes of DPS and implementations (e.g., accessing both sides of a membrane) can be difficult in small applications.

SUMMARY

A sensor device is described herein. The sensor device includes a substrate having a substrate upper surface and a substrate lower surface opposite the substrate upper surface. The substrate forms a channel between the substrate upper surface and the substrate lower surface and forms first and second port holes through the substrate upper surface to the channel. The sensor device also includes an application-specific integrated circuit (ASIC) die mounted on the substrate upper surface so as not to cover the first port hole and the second port hole. The sensor device further includes an overmolding formed on the substrate upper surface that is molded over the ASIC die and forms first and second cavities surrounding the first and second port holes, respectively. The sensor device also includes a transducer electrically connected with the ASIC die and mounted within the first cavity on the substate upper surface so as to cover the first port hole. The sensor device further includes a lid attached to the overmolding and having first and second chimneys.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

Figure 1:
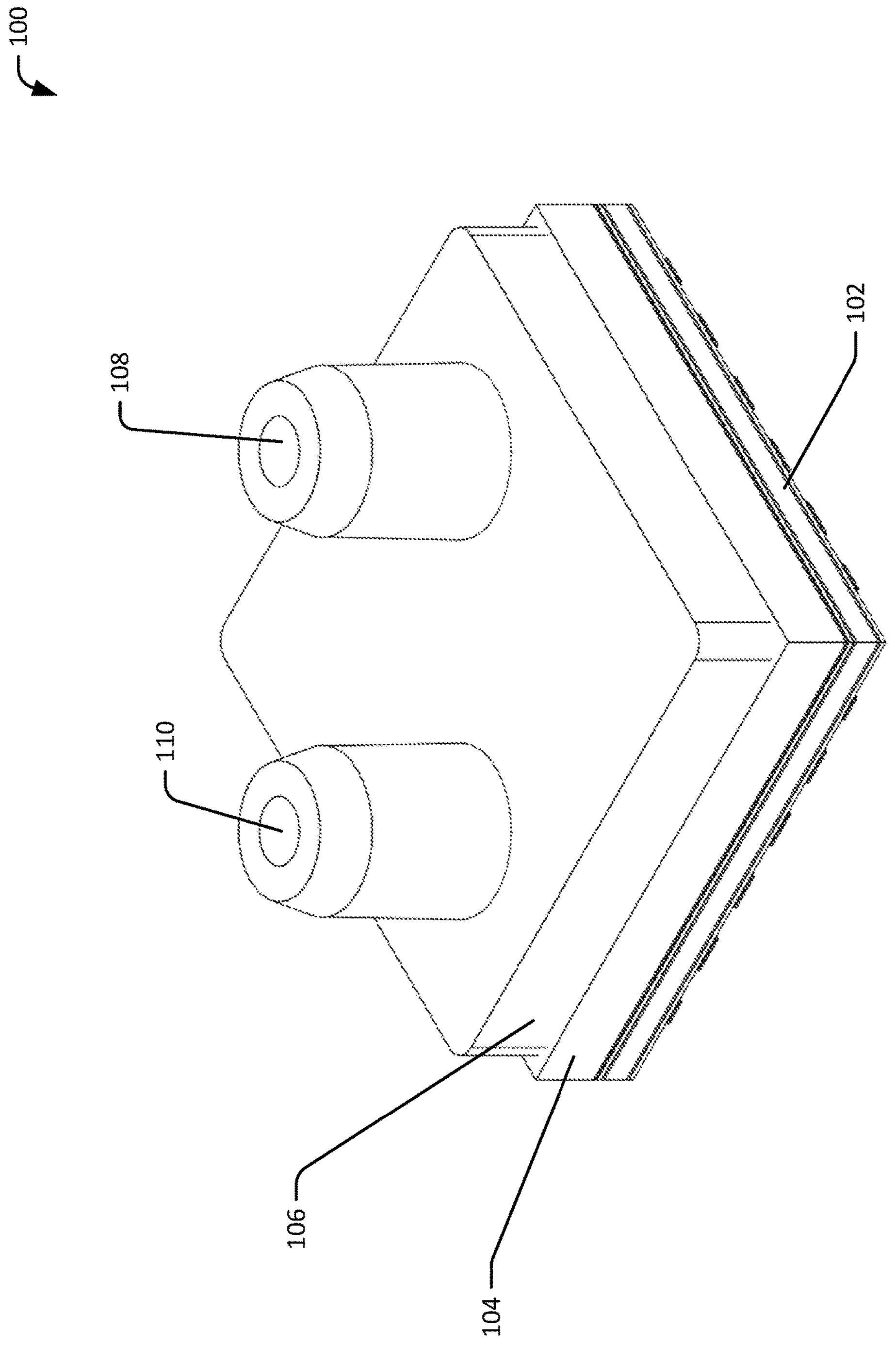
FIG. 1 illustrates an example of a laminate substrate-based differential pressure sensor package combining an air cavity channel substrate, an overmold, and a lid with two chimneys.

FIG. 1 illustrates an example of a differential pressure sensor 100. The differential pressure sensor 100 contains a substrate 102, an overmolding 104, and a lid 106. The lid 106 contains a first port 108 and a second port 110. The first port 108 and the second port 110 may be configured to accept tubing, piping, or directly connect to an area of interest. The differential pressure sensor 100 is configured to measure a pressure differential between the first port 108 and the second port 110. The differential pressure sensor 100 may have a rectangular footprint and have a size on the order of 7 mm long by 7 mm wide by 5 mm tall. The differential pressure sensor 100 may be configured to be disposed in a variety of environments ranging from −40 C to 85 C. Furthermore, the differential pressure sensor 100 may be configured to withstand at least 5 bar of differential pressure.

Figure 2:
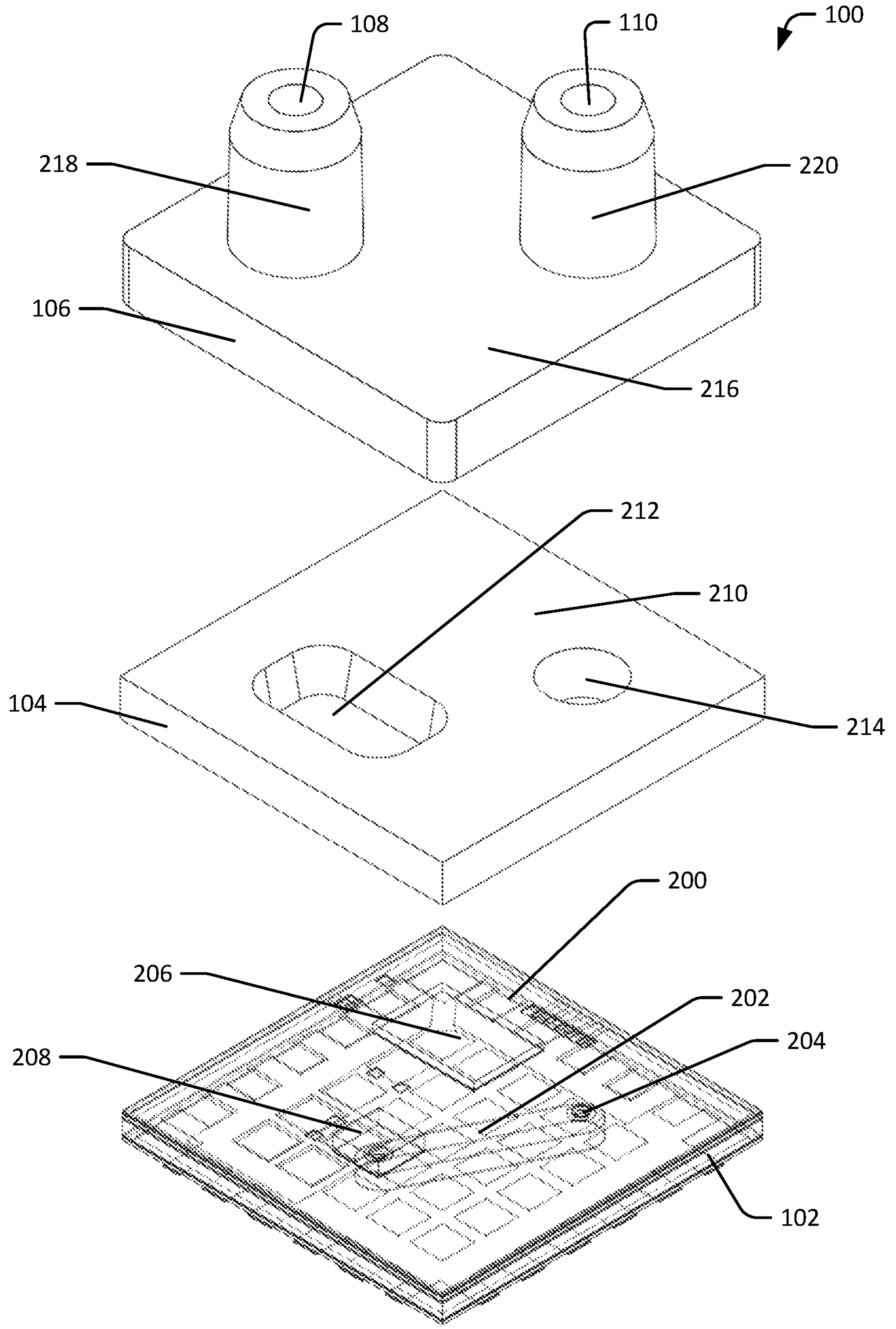
FIG. 2 illustrates an exploded view of the laminate substrate-based differential pressure sensor package combining an air cavity channel substrate, an overmold, and a lid with two chimneys.

FIG. 2 illustrates an exploded view of the differential pressure sensor 100. The substrate 102 contains a substrate upper surface 200. Formed between the substrate upper surface 200 and a substrate lower surface (not shown), is a channel 202. Formed through the substrate upper surface 200 to the channel 202 is a first port hole (not shown) and a second port hole 204. The first port hole and the second port hole 204 are formed on opposite ends of the channel 202. The substrate 102 may be a four-layer structure (as discussed further below) with an overall thickness around 600 μm. The channel 202 may have a depth around 360 μm.

The channel 202 may be straight along a longitudinal axis with a rectangular cross section. A length of the channel 202 may be configured to mitigate condensation forming within the channel 202. Furthermore, the longitudinal axis of the channel 202 may be non-parallel to sides of the differential pressure sensor 100. In other words, as illustrated, the channel 202 may traverse diagonally across the substrate 102.

Attached to the substrate upper surface 200 are an ASIC die 206 and a transducer 208. The ASIC die 206 may be a semiconductor device and/or comprise a complementary metal oxide semiconductor (CMOS). The ASIC die 206 is configured to receive a voltage (or other electrical property)

from the transducer 208 and communicate the voltage (or other electrical property) or a differential pressure to an external device.

The transducer 208 is communicatively coupled with the ASIC die 206. The transducer 208 may be a micro-electro-mechanical system (MEMS) with a membrane configured to affect a capacitance of the transducer 208 in response to a difference in pressure between the sides of the membrane. Other differential pressure sensing devices may be used without departing from the scope of this disclosure. For example, the transducer 208 may be piezoresistive, optical fiber, resonant, or piezoelectric. Regardless of how it is configured, the transducer 208 is configured to output an electrical property (e.g., voltage) that varies according to the differential pressure.

The transducer 208 is disposed on top of the first port hole in the substrate. Doing so allows a pressure from within the channel 202 to be communicated to one side of the transducer 208. Accordingly, a pressure reaching the second port hole 204 is communicated via the channel 202 to the first port hole and, thus, one side of the transducer 208.

Formed on top of the substrate 102 (e.g., on the substrate upper surface 200) is the overmolding 104 having an overmolding upper surface 210. The overmolding 104 is configured to encapsulate the ASIC die 206 while forming a first cavity 212 around the transducer 208 and a second cavity 214 around the second port hole 204. The first cavity 212 and the second cavity 214 are formed through the overmolding 104 (e.g., from the overmolding upper surface 210 to an overmolding lower surface (not shown)). The first cavity 212 may be formed such that, when the lid 106 is installed, the first port 108 is not directly above the transducer 208. In other words, the first port 108 may be offset from a top of the transducer 208. Doing so may help with environmental impact on the transducer 208 (e.g., anything falling through the port 108 will not land on the transducer 208). The shapes, sizes, and/or locations of the first cavity 212 and the second cavity 214 may vary without departing from the scope of this disclosure.

Attached to the overmolding upper surface 210 is the lid 106. The lid 106 may be formed of a plastic (e.g., a liquid-crystal polymer). The lid 106 has a lid upper surface 216 that is opposite a lid lower surface (not shown) that is attached to the overmolding upper surface 210. Protruding from the lid upper surface 216 is a first chimney 218 and a second chimney 220. The first chimney 218 and the second chimney 220 may be generally cylindrical and coaxial with the first port 108 and the second port 110, respectively. It should be noted that the first port 108 is aligned with the first cavity 212 and the second port 110 is aligned with the second cavity 214. Accordingly, the first port 108 communicates a first pressure to a top side of the transducer 208 and the second port 110 communicates a second pressure to a bottom side of the transducer via the second port hole 204, the channel 202, and the first port hole.

Figure 3:
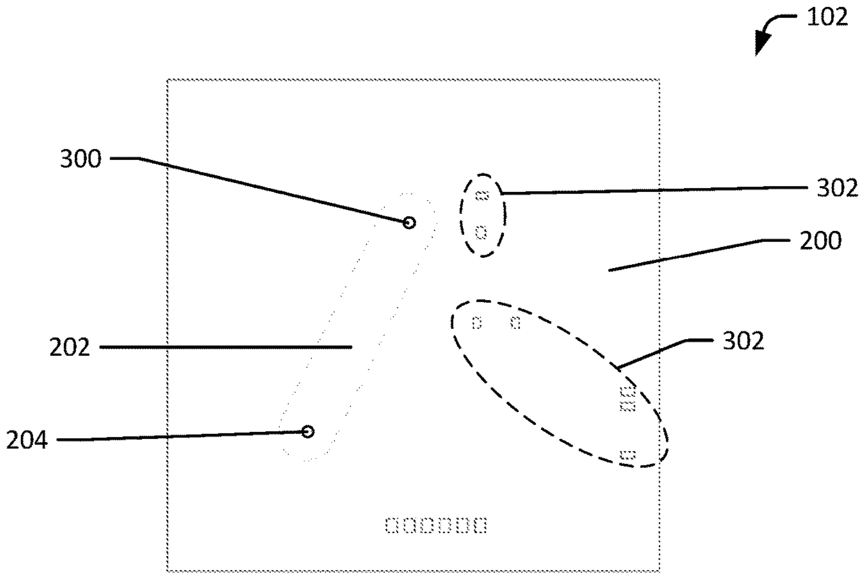
FIG. 3 illustrates a top plan view of a substrate of the laminate substrate-based differential pressure sensor package combining an air cavity channel substrate, an overmold, and a lid with two chimneys.

FIG. 3 illustrates a top plan view of the substrate 102 prior to having the ASIC die 206 or the transducer 208 installed thereon. As discussed above, the substrate 102 contains the channel 202, the second port hole 204, and the first port hole 300. Disposed on the substrate upper surface 200 are one or more transducer bond pads 302 and one or more ASIC die bond pads 304. The transducer bond pads 302 are configured to communicatively couple the transducer 208 to the ASIC die 206. The ASIC die bond pads 304 are configured to communicatively couple the ASIC die 206 to the transducer 208 and to couple the ASIC die 206 to one or more substrate bond pads on the substrate lower surface. The bond pads may be coupled to each other via metal layers in the substrate, vias, or any other number of electrical connections.

Figure 4:
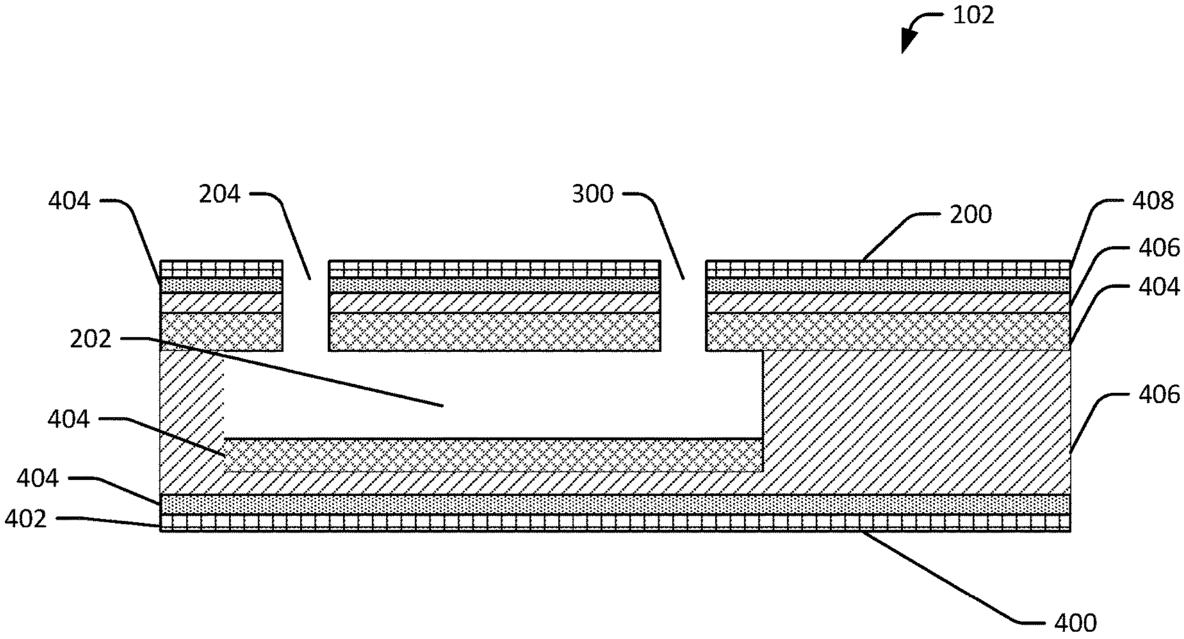
FIG. 4 illustrates a section view through a channel of the substrate of the laminate substrate-based differential pressure sensor package combining an air cavity channel substrate, an overmold, and a lid with two chimneys.

FIG. 4 illustrates a section view of the substrate 102 through the channel 202. The substrate 102 will be described from the bottom up. On a bottom of the substrate 102 is the substrate lower surface 400. The substrate lower surface 400 may be formed as part of a lower solder mask layer 402. Above the lower solder mask layer 402 is a first of a plurality of metal layers 404. The metal layers 404 may be disposed as shown, including lining a top and bottom of the channel 202. The metal layers 404 around the channel 202 may form structural components to stiffen the substrate 102. The other metal layers 404 may be used for electrical connections. The metal layers 404 may comprise one or more materials. Above the lower-most metal layer 404 is a first of a plurality of core layers 406. The core layers 406 may be non-conductive. Above the upper-most metal layer 404 (e.g., a signal layer), is an upper solder mask layer 408 that forms the substrate upper surface 200.

The transducer bond pads 302 and the ASIC die bond pads 304 may be portions of the upper-most metal layer 404 exposed via the upper solder mask layer 408. The substrate bond pads may be portions of the lower-most metal layer 404 exposed via the lower solder mask layer 402 Various vias, plugs, drills, pads, wires, and other structures through or on the substrate 102 may exist to facilitate signals/communications between the ASIC die 206 and the transducer 208 and/or between the ASIC die 206 and an external device.

Figure 5:
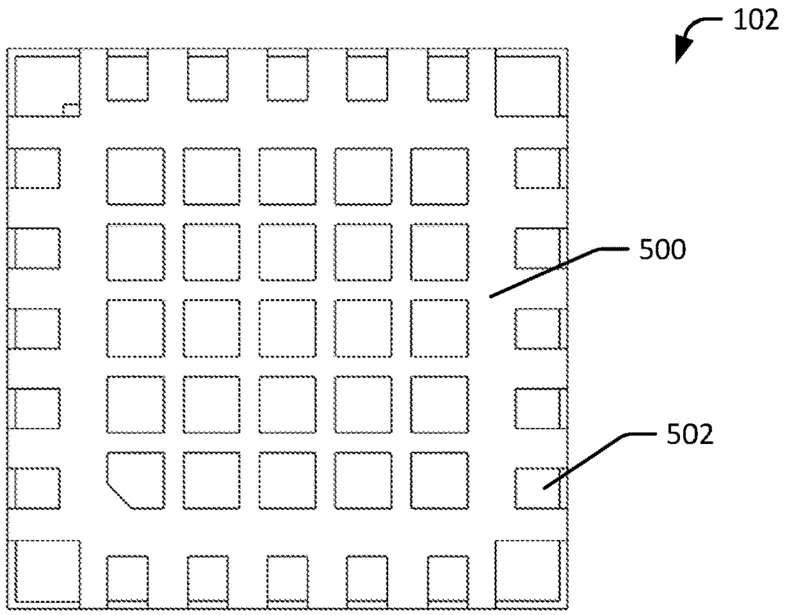
FIG. 5 illustrates a bottom plan view of the substrate of the laminate substrate-based differential pressure sensor package combining an air cavity channel substrate, an overmold, and a lid with two chimneys.

FIG. 5 illustrates a bottom plan view of the substrate 102. The substrate 102 has a substrate lower surface 500 and substrate pins 502 that form a land grid array (LGA). The substrate pins 502 may be exposed portions of the lower-most metal layer 404 through the lower solder mask layer 402. The substrate pins 502 may enable communication between the ASIC die 206 and an external device and/or provide structural bonding between the substrate 102 (and thus, the differential pressure sensor 100) and the external device. The configuration of the substrate pins 502 may vary without departing from the scope of this disclosure. For example, there may be any number of substrate pins 502 and each substrate pin 502 may have any shape, size, and orientation.

Figure 6:
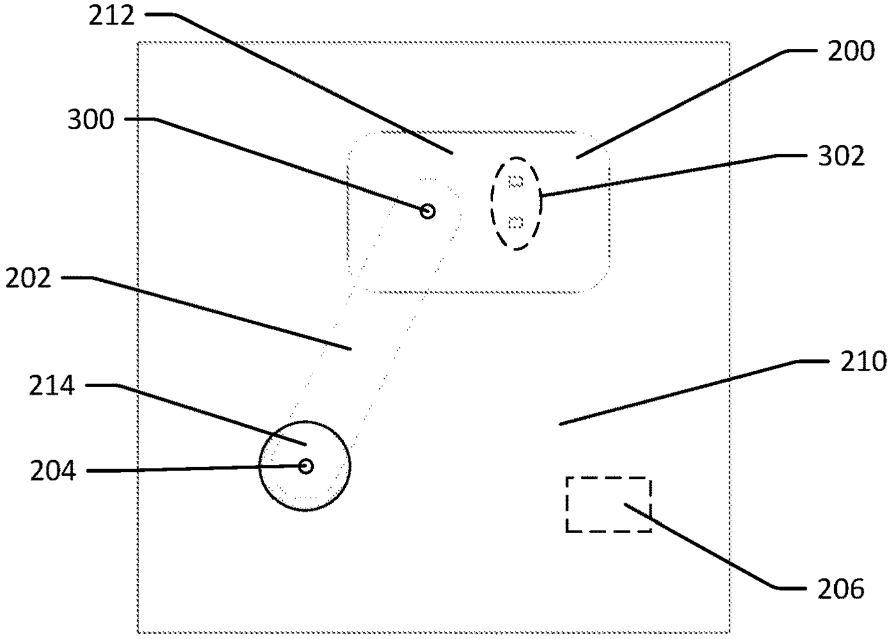
FIGS. 6-10 illustrate top plan views of the laminate substrate-based differential pressure sensor package combining an air cavity channel substrate, an overmold, and a lid with two chimneys as various manufacturing steps are applied.

FIG. 6 illustrates a top plan view of the differential pressure sensor 100 after the overmolding 104 has been applied to the substrate upper surface 200. After the overmolding 104 has been applied/formed, the differential pressure sensor 100 has the overmolding upper surface 210 with the first cavity 212 and the second cavity 214 formed within the overmolding 104 and exposing portions of the substrate upper surface 200. As discussed above, the first cavity 212 exposes the first port hole 300 and the transducer bond pads 302. The second cavity 214 exposes the second port hole 204. The overmolding 104 also encapsulates/covers the ASIC die 206.

Figure 7:
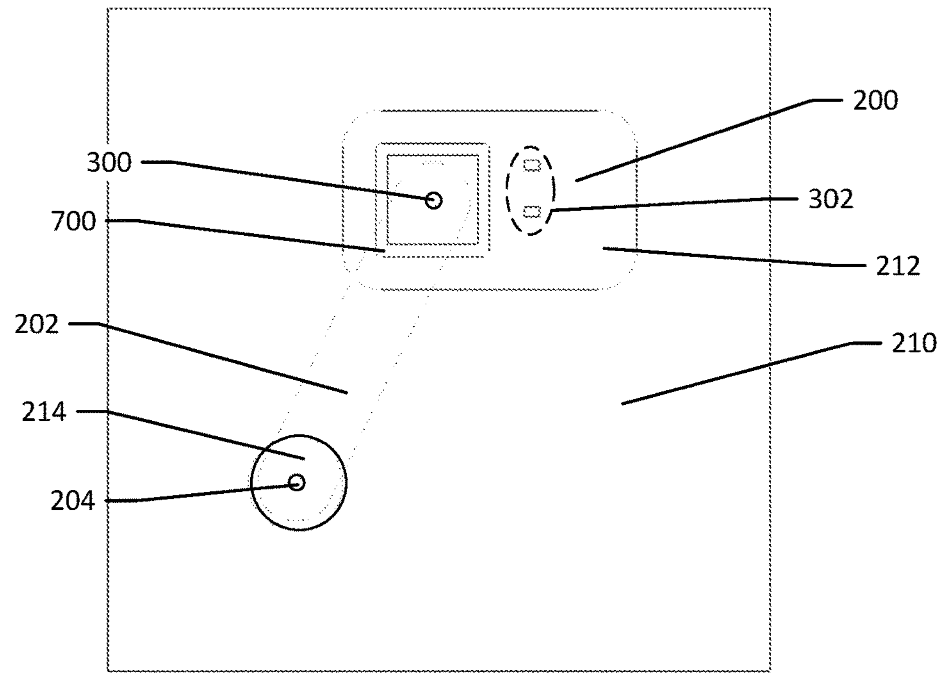

FIG. 7 illustrates a top plan view of the differential pressure sensor 100 after an adhesive layer 700 has been applied to the substrate 102. The adhesive layer 700 is configured to provide for pressure transfer between the channel 202 and an underside of the transducer 208 (e.g., a membrane of the transducer 208), form a seal between the substrate upper surface and the underside of the transducer 208, and also to provide stress decoupling (e.g., due to differences in thermal expansions) between the transducer 208 and the substrate 102. The adhesive layer 700 surrounds the first port hole 300 and has a shape that corresponds to a perimeter of the transducer 208. The adhesive layer 700 may be a low-modulus epoxy (e.g., 0.5 MPa at 100% elongation) and have a bond line thickness (BLT) of around 40 μm.

Figure 8:
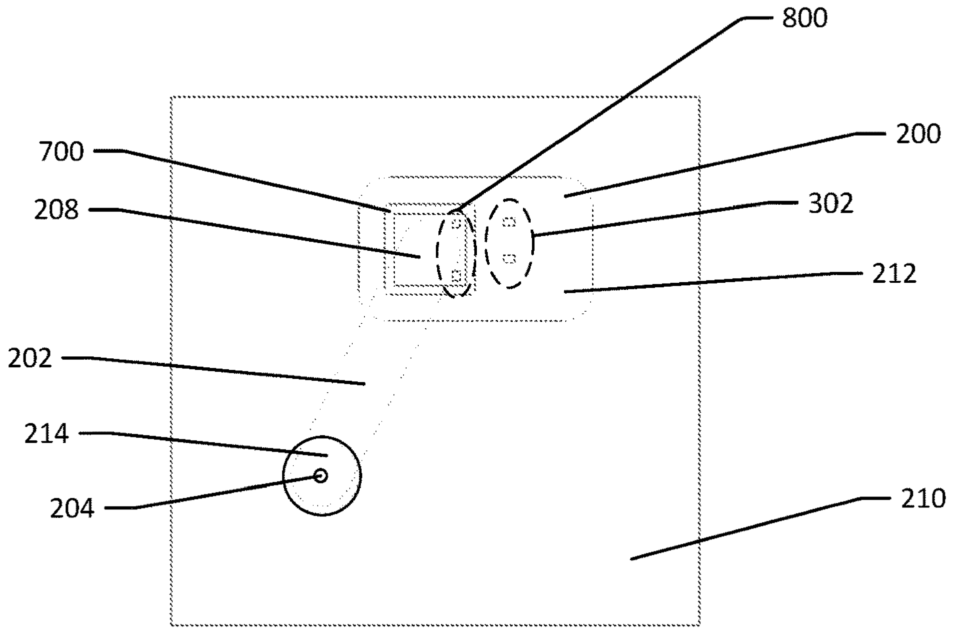

FIG. 8 illustrates a top plan view of the differential pressure sensor 100 after the transducer 208 is affixed to the substrate 102 via the adhesive layer 700. The transducer 208 is affixed such that it covers the first port hole 300. The transducer 208 includes transducer connection pads 800 that are configured to connect with the transducer bond pads 302. In some implementations, the transducer 208 may be directly bonded to the transducer bond pads 302 and sealed using the adhesive layer 700.

Figure 9:
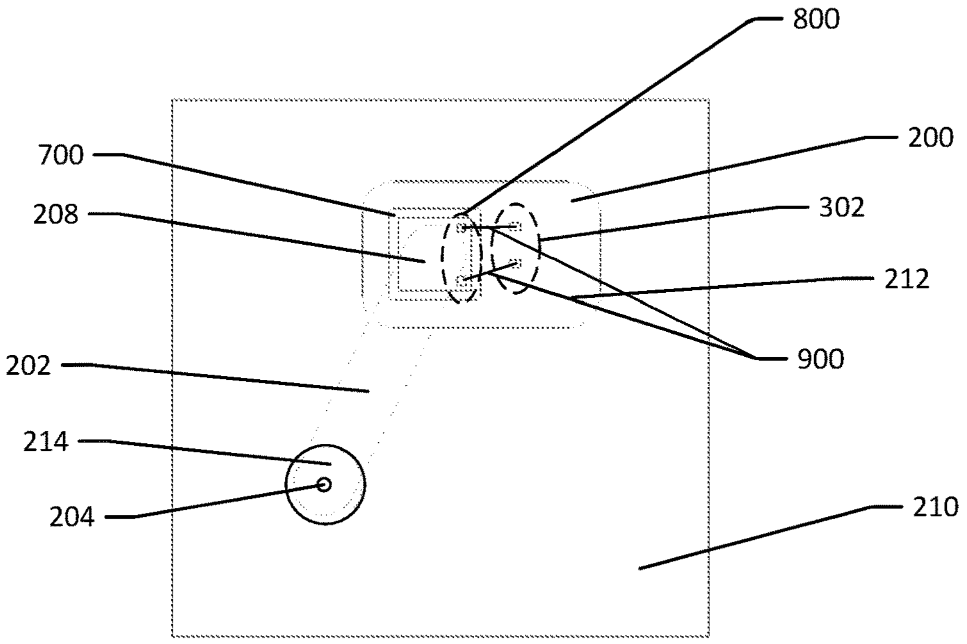

FIG. 9 illustrates a top plan view of the differential pressure sensor 100 after the transducer connection pads 800 are connected with the transducer bond pads 302. The transducer connection pads 800 may be connected with the transducer bond pads 302 using wires 900. Other ways of connecting the transducer connection pads 800 to the transducer bond pads 302 may be used without departing from the scope of this disclosure. For example, the transducer connection pads 800 may be connected with the transducer bond pads 302 as part of installing the transducer 208. There may also be a connector to which the transducer 208 may be connected. Regardless, the connection of the transducer 208 ensures that the transducer 208 is in electrical connection with the ASIC die 206.

Figure 10:
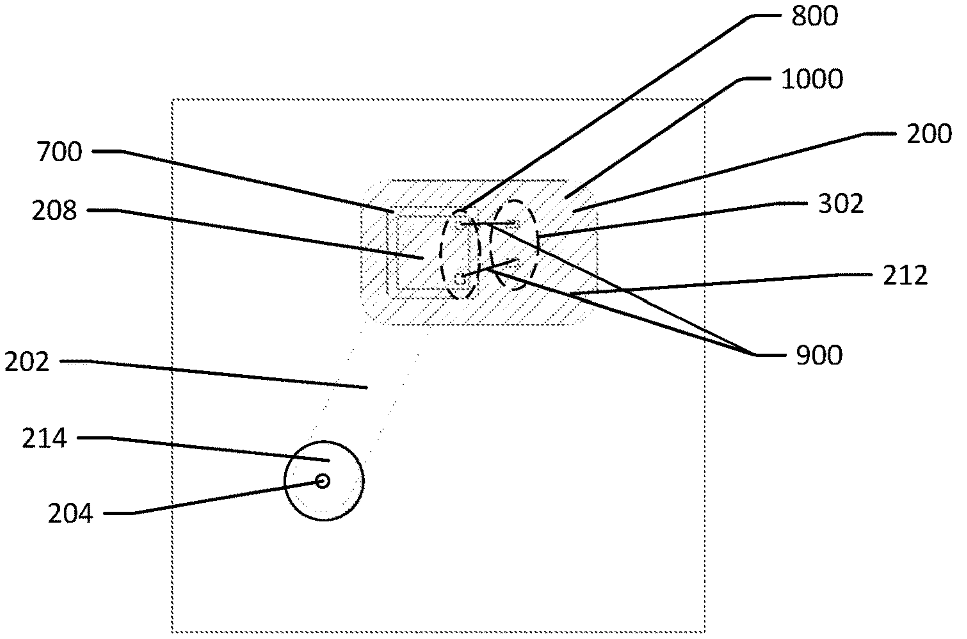

FIG. 10 illustrates a top plan view of the differential pressure sensor 100 after the transducer 208 and associated connections have been covered with a protection layer 1000. The protection layer 1000 is disposed within the first cavity 212 and configured to cover the transducer 208 and associated connections (e.g., the transducer connection pads 800, the transducer bond pads 302, the wires 900). The protection layer 1000 is configured to adequately protect the components without affecting performance of the transducer 208. For example, the protection layer 1000 may comprise a 100 μm thickness of a perfluoropolyether material (1-part or 2-part).

Figure 11:
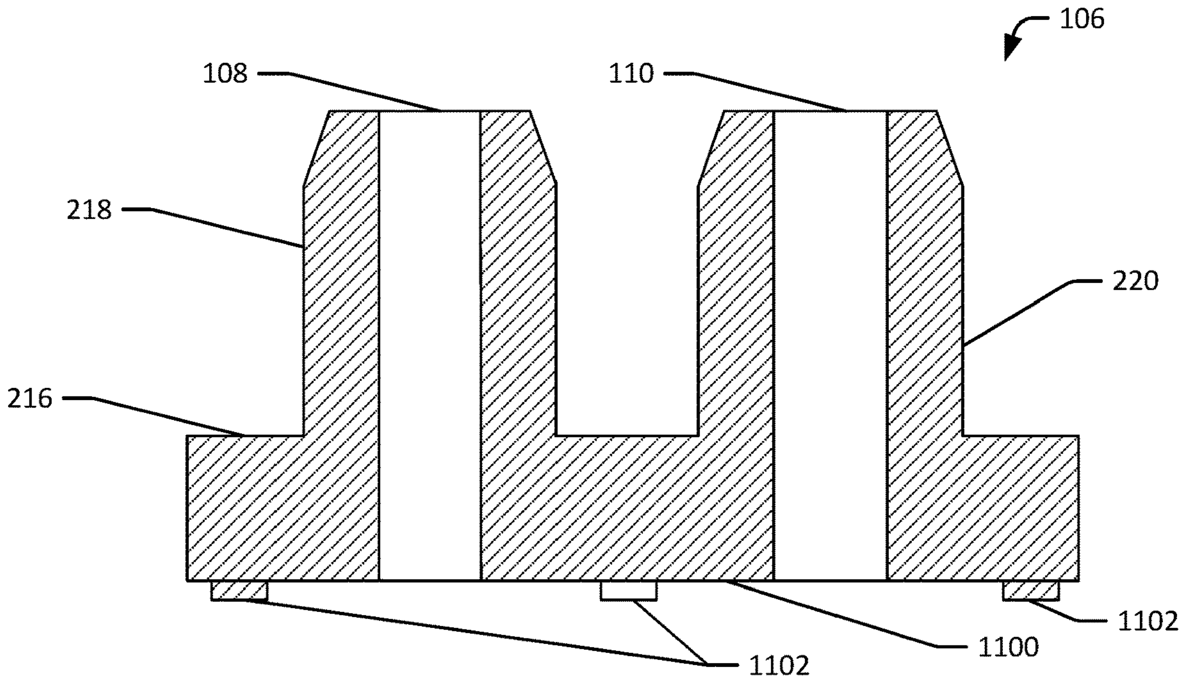
FIG. 11 illustrates a section view through chimneys of a lid of the laminate substrate-based differential pressure sensor package combining an air cavity channel substrate, an overmold, and a lid with two chimneys.

FIG. 11 illustrates a section view of the lid 106 through the first chimney 218 and the second chimney 220. As discussed above, the lid 106 has a lid upper surface 216 and a lid lower surface 1100. The first chimney 218 and the second chimney 220 extend from the lid upper surface 216 in a generally cylindrical manner. The first port 108 and the second port 110 are formed within the first chimney 218 and the second chimney 220, respectively. Protruding from the lid lower surface 1100 are standoffs 1102. The standoffs 1102 are configured to maintain a separation distance between the lid 106 and the overmolding 104 when the lid 106 is attached to the overmolding 104 (e.g., to ensure a proper adhesive thickness). For example, the standoffs 1102 may be around 25 μm in height.

Figure 12:
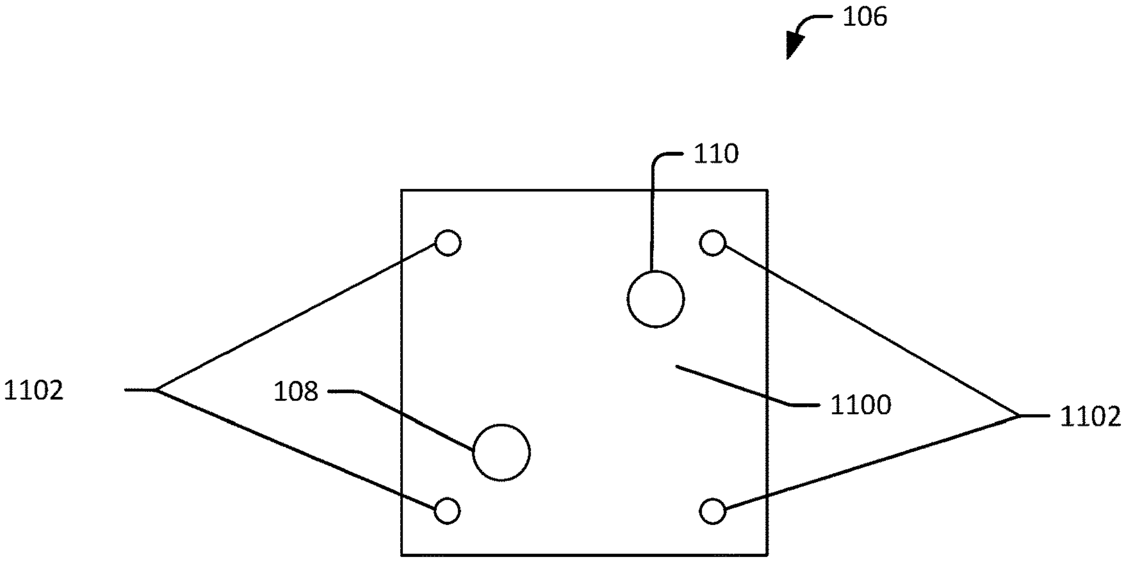
FIG. 12 illustrates a bottom plan view of the lid of the laminate substrate-based differential pressure sensor package combining an air cavity channel substrate, an overmold, and a lid with two chimneys.

FIG. 12 illustrates a bottom plan view of the lid 106. The first port 108 and the second port 110 run through the lid 106 to the lid lower surface 1100. The standoffs 1102 may be placed in corners of the lid lower surface 1100 as shown. A number and/or configuration of the standoffs 1102 may vary without departing from the scope of this disclosure. Furthermore, in some implementations, standoffs 1102 may not be used.

Figure 13:
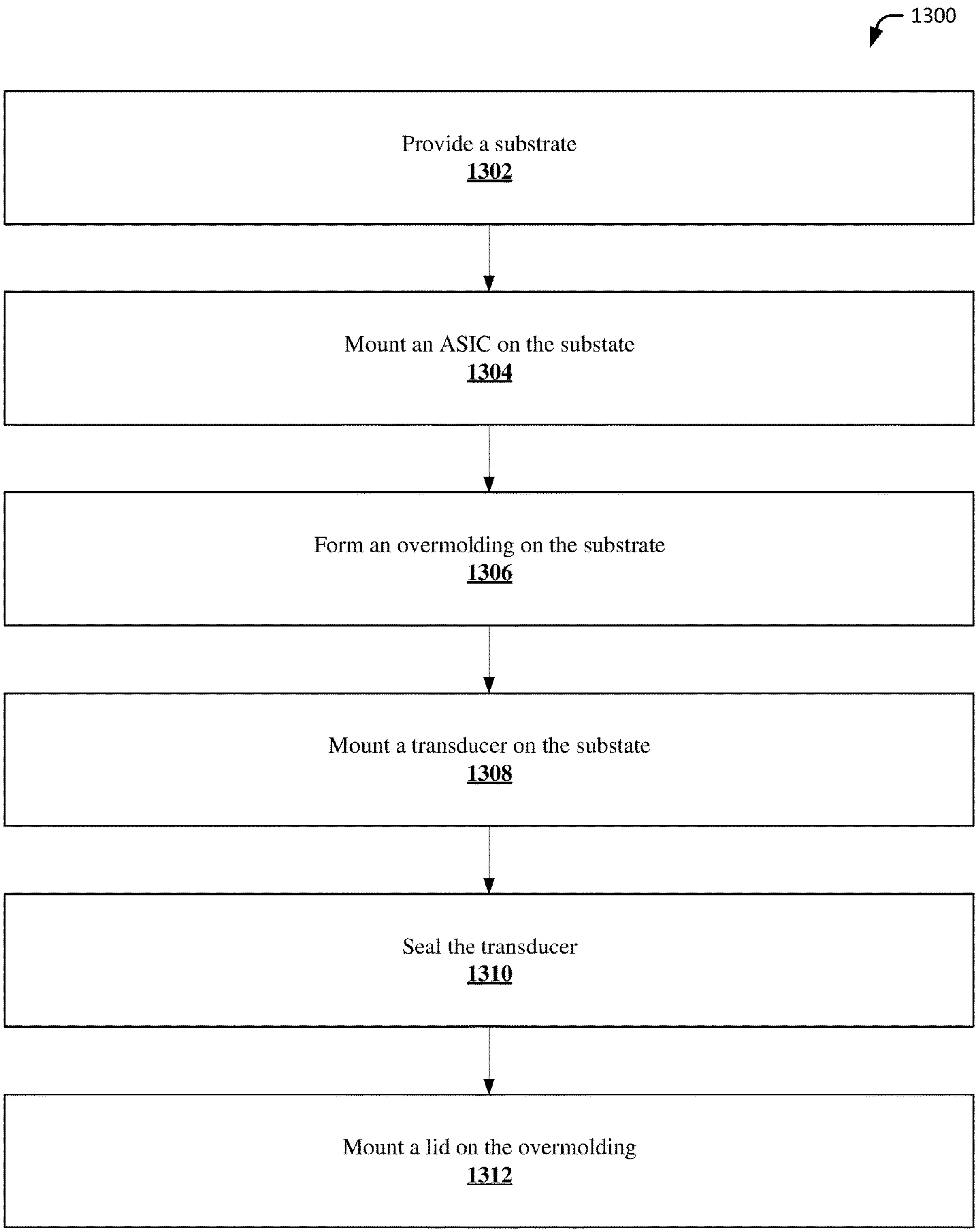
FIG. 13 illustrates an example method of manufacturing the laminate substrate-based differential pressure sensor package combining an air cavity channel substrate, an overmold, and a lid with two chimneys.

FIG. 13 illustrates an example method 1300 of manufacturing the differential pressure sensor 100. Example method 1300 can include one or more operations, actions, or functions as illustrated by one or more of blocks 1302 to 1312. Although illustrated as discrete blocks, various blocks may be divided into additional blocks, combined into fewer blocks, eliminated, performed in different order, or performed in parallel, depending on the desired implementation.

At 1302, a substrate is provided. For example, the substrate 102 may be provided.

At 1304, an ASIC die is mounted on the substrate. For example, the ASIC die 206 may be mounted on the substrate upper surface 200. In some implementations, the ASIC die 206 may already be installed on the substrate 102 when it is provided, thus, rendering step 1304 moot.

At 1306, an overmolding is formed on the substrate. For example, the overmolding 104 may be formed or molded on top of the substrate upper surface 200 forming the first cavity 212 and the second cavity 214.

At 1308, a transducer is mounted on the substrate. For example, the transducer 208 may be adhered to the substrate upper surface 200 via the adhesive layer 700. The mounting may involve electrically connecting the transducer 208 to the substrate 102 (e.g., via wires 900).

At 1310, the transducer is sealed. For example, the protection layer 1000 may be applied within the first cavity 212. The protection layer 1000 may cover the transducer 208 and associated wiring/connection points (e.g., the transducer connection pads 800, the transducer bond pads 302, and the wires 900).

At 1312, a lid is mounted on the overmolding. For example, the lid 106 may be attached to the overmolding upper surface 210. The lid 106 may be attached using any mechanical or chemical means (e.g., a non-conductive epoxy) and may utilize standoffs 1102 to maintain a separation distance between the overmolding upper surface 210 and the lid lower surface 1100.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A sensor device comprising:
a substrate comprising:
a plurality of layers;
a substrate upper surface; and
a substrate lower surface opposite the substrate upper surface,
wherein the substrate forms:
a channel between the substrate upper surface and the substrate lower surface, wherein a bottom of the channel is formed by a first metal layer of the layers and a top of the channel is formed by a second metal layer of the layers;
a first port hole through the substrate upper surface to the channel; and
a second port hole through the substrate upper surface to the channel;
an application-specific integrated circuit (ASIC) die mounted on the substrate upper surface so as not to cover the first port hole and the second port hole;
an overmolding formed on the substrate upper surface and molded over the ASIC die,
wherein the overmolding forms a first cavity surrounding the first port hole and a second cavity surrounding the second port hole, and
wherein the overmolding comprises an overmolding upper surface;
a micro-electromechanical system (MEMS) transducer, wherein the MEMS transducer is:
mounted on the substrate upper surface so as to cover the first port hole;
placed within the first cavity; and
electrically connected with the ASIC die; and
a lid attached to the overmolding upper surface, wherein the lid comprises:
a lid upper surface;
a first chimney protruding from the lid upper surface and aligned with the first cavity; and
a second chimney protruding from the lid upper surface and aligned with the second cavity.

2. The sensor device of claim 1, wherein the sensor device is a differential pressure sensor.

3. The sensor device of claim 1, wherein the substrate further comprises a plurality of pins disposed on the substrate lower surface that are electrically connected with the ASIC die.

4. The sensor device of claim 1, wherein the channel has a rectangular cross section.

5. The sensor device of claim 1, wherein the channel is straight.

6. The sensor device of claim 1, wherein the ASIC die comprises a complementary metal oxide semiconductor (CMOS).

7. The sensor device of claim 1, wherein the MEMS transducer comprises a membrane.

8. The sensor device of claim 1, wherein the first chimney and the second chimney are configured to connect with tubing.

9. The sensor device of claim 1, wherein the first chimney and the second chimney are substantially cylindrical.

10. The sensor device of claim 1, wherein:
the lid further comprises a lid lower surface opposite the lid upper surface; and
the lid lower surface is attached to the overmolding upper surface.

11. The sensor device of claim 10, wherein the lid further comprises one or more standoffs configured to maintain a minimum adhesive thickness between the overmolding upper surface and the lid lower surface.

12. The sensor device of claim 1, wherein the lid is formed of a liquid-crystal polymer.

13. The sensor device of claim 1, wherein the sensor device further comprises a protection layer formed over the MEMS transducer.

14. The sensor device of claim 1, wherein:
the sensor device has a rectangular footprint; and
the channel is formed diagonally across the rectangular footprint.

15. The sensor device of claim 1, wherein:
the sensor device further comprises an adhesive layer disposed between the transducer and the substrate upper surface; and
the adhesive layer is configured to:
allow for pressure transfer between the channel and an underside of the transducer;
form a seal between the substrate upper surface and the underside of the transducer; and
provide stress decoupling between the substrate upper surface and the transducer.

16. The sensor device of claim 1, wherein the substrate further comprises a plurality of pins disposed on the substrate lower surface that form a land grid array (LGA).

17. The sensor device of claim 1, wherein the layers comprise, from a bottom to top of the substrate:
a first solder mask layer forming the substrate lower surface;
a first metal connection layer;
a first non-conductive core layer forming sides of the channel;
the second metal layer;
a second non-conductive core layer;
a second metal connection layer; and
a second solder mask layer forming the substrate upper surface.

18. The sensor device of claim 17, wherein the first metal layer is disposed within the first non-conductive core layer.

19. The sensor device of claim 17, wherein the first metal layer and the second metal layer are thicker than the first metal connection layer and the second metal connection layer.

20. The sensor device of claim 17, further comprising one or more drills electrically connecting the first metal connection layer and the second metal connection layer.

* * * * *